United States Patent [19]

Noguchi et al.

[11] Patent Number: 6,143,363
[45] Date of Patent: Nov. 7, 2000

[54] COATING AND CURING COMPOSITION OF WATER-SOLUBLE CATIONIC GROUP-CONTAINING REACTION PRODUCT AND POLY(METH)ACRYLATE

[75] Inventors: Hiromichi Noguchi, Hachiouji; Masami Ikeda, Yokohama; Makiko Kimura, Sagamihara; Masato Katayama; Akio Kashiwazaki, both of Yokohama; Yoshie Nakata, Kawasaki; Yuko Nishioka, Tokyo, all of Japan

[73] Assignee: Canon Kabushiki Kaisha, Tokyo, Japan

[21] Appl. No.: 09/178,584

[22] Filed: Oct. 26, 1998

Related U.S. Application Data

[62] Division of application No. 08/635,622, Apr. 22, 1996, Pat. No. 5,861,194.

[30] Foreign Application Priority Data

Apr. 20, 1995 [JP] Japan .................................. 7-095045
Mar. 28, 1996 [JP] Japan .................................. 8-074354

[51] Int. Cl.[7] .............................. B05D 1/36; B05D 3/06; B05D 5/04; C08K 3/20; C08K 63/00
[52] U.S. Cl. .......................... 427/261; 427/164; 427/386; 427/387; 427/388.2; 427/389; 427/393.5; 523/414; 524/502; 524/503; 524/521; 525/57; 525/113; 525/187; 525/209; 525/218
[58] Field of Search ..................... 427/164, 261, 427/386, 387, 388.2, 389, 393.5; 523/414; 524/502, 503, 521; 525/57, 113, 187, 209, 218

[56] References Cited

U.S. PATENT DOCUMENTS

| | | | |
|---|---|---|---|
| 4,443,223 | 4/1984 | Kissling et al. | 8/496 |
| 4,741,969 | 5/1988 | Hayama et al. | 428/514 |
| 4,877,680 | 10/1989 | Sakaki et al. | 428/332 |
| 5,132,146 | 7/1992 | Maruyama et al. | 427/261 |
| 5,212,008 | 5/1993 | Malhotra et al. | 428/216 |
| 5,496,634 | 3/1996 | Ogawa et al. | 428/341 |
| 5,612,388 | 3/1997 | Irizawa et al. | 526/304 |
| 5,798,397 | 8/1998 | Noguchi et al. | 522/81 |

FOREIGN PATENT DOCUMENTS

| | | |
|---|---|---|
| 2552564 | 6/1976 | Germany . |
| 62-94379 | 4/1987 | Japan . |
| 62-94380 | 4/1987 | Japan . |
| 62-221591 | 9/1987 | Japan . |
| 62-242578 | 10/1987 | Japan . |
| 1-229685 | 9/1989 | Japan . |
| 1-286886 | 11/1989 | Japan . |

*Primary Examiner*—Robert E. L. Sellers
*Attorney, Agent, or Firm*—Fitzpatrick, Cella, Harper & Scinto

[57] ABSTRACT

A composition comprising a water-soluble cationic group-containing high-molecular compound (P1) derived from the reaction of (A) epichlorohydrin and a dialkyl or dialkanol amine, or (B) a glycidyl group-terminated hydrophilic oligomer and a diamine, dialkylamine or dialkanolamine; optionally, a high-molecular compound (P2) having a condensable functional group in a side chain such as alkylolacrylamide-bearing high-molecular compound (E) or hydrolyzable trialkylsilyl group-containing acrylic ester high-molecular compound (F); and a poly(meth)acrylate (P3) is coated onto a substrate and cured by ultraviolet radiation to form a printing medium.

6 Claims, No Drawings

COATING AND CURING COMPOSITION OF WATER-SOLUBLE CATIONIC GROUP-CONTAINING REACTION PRODUCT AND POLY(METH)ACRYLATE

This application is a divisional of application Ser. No. 08/635,622 filled Apr. 22, 1996, now U.S. Pat. No. 5,861,194.

BACKGROUND OF THE INVENTION

1. Field of the Invention

The present invention relates to an improved curing composition comprising a specific water soluble high-molecular compound having a cationic group in the principal molecular chain thereof and another specific water soluble high-molecular compound having a crosslinking property, which is capable of providing a condensed and crosslinked structure or a polymerized and crosslinked structure upon the application of thermal energy or the irradiation of ultraviolet rays and which enables to form a desirable ink-receiving layer which excels in waterfastness and ink receiving property. The present invention includes a printing medium formed of said curing composition and a process for producing a print product with the use of said curing composition.

2. Related Background Art

In recent years, an ink jet recording system has made rapid progress in the digital recording system field, and it has been widely used as an outputting terminal printer for personal computers, particularly used in offices. This situation is based on an outcome that a recording apparatus having a desirable printability for a recording medium having a hygroscopic property to water-based ink has been developed.

As such ink jet recording system, there have been proposed various ink jet recording apparatus. These ink jet recording apparatus are mostly of the so-called bubble jet system in which thermal energy is utilized for discharging ink. In the bubble jet recording apparatus, there is usually used water-based ink for performing printing for a printing medium. Therefore, particularly in the case where the bubble jet recording apparatus is used as a printing apparatus for producing a volume of print products, due care must be used with printing mediums to be dedicated for printing because they are often poor in absorption of said water-based ink. As such printing medium dedicated for printing in this, there can be mentioned, for examples, metal members, plastic members, rubber members, ceramics, fabrics, leathers, glass products, and food products. In the case where the printing medium does not have a sufficient property of absorbing the water-based ink, the printing medium is necessary to be designed such that it has an ink-absorptive layer (that is, an ink-receiving layer).

By the way, there are known coating compositions for OHP films which have been designed to be suitable for the printing by the ink jet printing apparatus. However, these coating compositions are not suitable for use in the case of industrially printing any of the above mentioned materials poor in absorption of the water-based ink by the ink jet printing apparatus, because any of the coating compositions is difficult to form a film as an ink-receiving layer which is insufficient in adhesion, coating suitability, and durability against a substrate comprising any of the above mentioned materials dedicated for printing by the ink jet printing apparatus.

Now, as for the ink-receiving layer formed on such material poor in absorption of the water-based ink so that printing by the ink jet printing apparatus can be desirably conducted, the ink-receiving layer is necessary to be formed of a material which satisfies the following conditions:

(i) the material enables to form a desirable film as an ink-receiving layer within a short period of time, (ii) the material enables to form a desirable film as an ink-receiving layer which has a sufficient adhesion against a substrate, (iii) the material enables to form a desirable film as an ink-receiving layer which allows ink to be shortly fixed thereon, (iv) the material enables to form a desirable film as an ink-receiving layer which allows coloring components (dyes and pigments) of ink to be strongly fixed thereon, (v) the material enables to form a desirable film as an ink-receiving layer which allows the formation of a clear image at a high resolution thereon, and.

(vi) the material enables to form a desirable film as an ink-receiving layer which excels in fastness properties.

As the material by which a desirable film as an ink-receiving layer which satisfies these requirements is formed, it is considered effective to use a crosslinkable high-molecular compound and an activation energy-curable hydrophilic oligomer.

As for the recording medium, particularly for instance, the OHP film, dedicated for the printing by the ink jet printing apparatus, there have been made various proposals in view of attaining a desirable ink absorption therefor and attaining a desirable waterfastness for a print product. Such proposals are disclosed, for example, in Japanese Unexamined Patent Publications Nos. 94379/1987 (corresponding to U.S. Pat. No. 4,741,969), 94380/1987, 221591/1987, 242578/1987, 229685/1989, and 286886/1989.

Particularly, U.S. Pat. No. 4,741,969 discloses an aqueous ink recording sheet having an ink-receiving layer formed by photo-curing an anionic synthetic resin having a photopolymerizable double bond. However, in the formation of the ink-receiving layer in this document, it is essential to use polymer reaction of bonding an independent reactive monomer to a side chain of a given high-molecular compound. Because of this, there is a problem in that the production cost of the aqueous ink recording sheet unavoidably becomes high. In addition, there is also another problem in that it is quite difficult to stably synthesize a desired synthetic resin at a high reproducibility.

Japanese Unexamined Patent Publication No. 94380/1987 discloses an aqueous ink recording sheet having an ink-receiving layer formed by photo-curing a cationic synthetic resin having a photopolymerizable double bond. However, in the formation of the ink-receiving layer in this document, it is essential to use polymer reaction of bonding an independent reactive monomer to a side chain of a given high-molecular compound. Because of this, there is a problem in that the production cost of the aqueous ink recording sheet unavoidably becomes high. In addition, there is also another problem in that it is quite difficult to stably synthesize a desired synthetic resin at a high reproducibility.

Japanese Unexamined Patent Publication No. 221591/1987 discloses an aqueous ink recording sheet having a two-layered ink-receiving layer comprising a coating layer comprised of an anionic acrylic copolymer cured with the irradiation of ultraviolet rays as a principal component and a coating layer comprised of a cationic acrylic copolymer cured with the irradiation of ultraviolet rays as a principal component. The two-layered ink-receiving layer described in this document is featured in utilizing an ion complex present in the interfacial region between one layer comprised of an electrolytic high-molecular compound having a cationic property and the other layer comprised of an electrolytic high molecular compound having an anionic property. And according to the description of this document, it is understood that due to the presence of a solvent of an aqueous ink and molecules of a dye in a strong interaction (or an attraction) between an anion and cation which are locally distributed in the two-layered ink-receiving layer, not only molecules of the solvent but also the dye molecules are strongly prevented from being mobilized to result in providing an improvement in the apparent ink-fixing property and waterfastness. However, in practice, the use of the two-layered ink-receiving layer entails a drawback in that the aqueous ink is difficult to be dried quickly and therefore, there cannot be attained desirable fixing for the aqueous ink.

Japanese Unexamined Patent Publication No. 242578/1987 discloses a composition comprising a mixture of a cationic high-molecular compound and a high-molecular compound crosslinkable with the irradiation of ultraviolet rays which is suitable for the formation of an ink-receiving layer. According to the description of this document, it is understood that an ink-receiving layer formed of said composition is capable of trapping a dye of an aqueous ink by virtue of the cationic functional group of the cationic high-molecular compound, and when the ink-receiving layer is crosslinked with the irradiation of ultraviolet rays, it develops a structure with waterfastness. However, as for the ink-receiving layer, there are problems in that the two high-molecular compounds by which the ink-receiving layer is composed are likely to form a polyion complex between them, resulting in a marked reduction in the solubility of the composition to solvents used upon the formation of the ink-receiving layer by way of a coating process. In addition, the ink-receiving layer formed is of a remarkably inferior preservation stability even at room temperature and because of this, the ink-receiving property of the ink-receiving layer is gradually deteriorated during storage.

Japanese Unexamined Patent Publication No. 229685/1989 discloses an ink-receiving layer formed by subjecting a composition composed of a water soluble high-molecular compound and a hydrophilic oligomer having a terminal acryloyl group to crosslinking treatment. However, in practice, there is a considerable difference between the hydrophilic property possessed by the ink-receiving layer and the hydrophilic property required for an ink-receiving layer used in the ink jet printing using a water-based ink. Particularly, the ink-receiving layer described in this document does not easily satisfy the requirements relating to the ink receiving quantity and ink penetration speed in the printing by means of a color ink jet printing apparatus which has been widely used in recent years.

Japanese Unexamined Patent Publication No. 286886/1989 discloses curing materials comprising monofunctional or multifunctional monomers or oligomers which are suitable for the formation of an ink-receiving layer. This document also discloses materials capable of providing a cationic group required for the fixing of a dye. However the materials capable of providing a cationic group described in this document are monofunctional monomers and the multifunctional materials described in this document have no cationic group and therefore, they cannot form an ink-receiving layer having a desirable ink absorption rate and a desirable waterfastness at a curing rate practically employed upon the layer formation.

As apparent from the above description, in the prior art, there has not been proposed a crosslinkable composition which enables formation of an ink-receiving layer exhibiting a desirable absorptivity and absorption rate for water-based ink while exhibiting a fixing property for a coloring material of said water-based ink which are well compatible with the performance of the color ink jet printing apparatus which has been widely used in recent years.

SUMMARY OF THE INVENTION

A principal object of the present invention is to solve the foregoing problems in the prior art and enable printing of various products poor in absorption of water-based ink such as metal members, plastic members, rubber members, fabrics, ceramics, leathers, glass products, and food products by means of the ink jet printing apparatus using water-based ink.

Another object of the present invention is to provide a curing composition comprising a specific water soluble high-molecular compound having a cationic group and another specific water soluble high-molecular compound having a crosslinking property, which is capable of forming a desirable ink-receiving layer which enable to desirably conduct printing for any of those products above described to thereby obtain print products by the ink jet printing apparatus using water-based ink.

A further object of the present invention is to provide a curing composition comprising a specific water soluble high-molecular compound and another specific water soluble high-molecular compound having a crosslinking property, which is capable of forming an ink-receiving layer exhibiting desirable absorptivity and absorption rate for water-based ink and desirable waterfastness while exhibiting a fixing property for a coloring material of said water-based ink which are well compatible with, particularly, the performance of the color ink jet printing apparatus in which water-based ink is used.

A further object of the present invention is to provide a printing medium formed using said curing composition.

A further object of the present invention is to provide a process for producing a print product using said printing medium.

DESCRIPTION OF THE INVENTION AND PREFERRED EMBODIMENTS

A first aspect of the present invention lies in a curing composition comprising a water soluble high-molecular compound (P1) having a cationic group in the principal molecular chain thereof and a water soluble high-molecular compound (P2) having a side chain provided with a condensable functional group.

A second aspect of the present invention lies in a printing medium comprising a substrate and an ink-receiving layer disposed on said substrate, said ink-receiving layer comprising a solid layer containing a water soluble high-molecular compound (P1) having a cationic group in the principal molecular chain thereof and a water soluble high-molecular compound (P2) having a side chain provided with a condensable functional group.

A third aspect of the present invention lies in a process for producing a print product, said process comprising the steps of: providing a substrate and an ink-receiving layer disposed on said substrate, said ink-receiving layer comprising a solid layer containing a water soluble high-molecular compound (P1) having a cationic group in the principal molecular chain thereof and a water soluble high-molecular compound (P2) having a side chain provided with a condensable functional group; and performing printing with the use of said printing medium and ink, to thereby obtain a print product.

A fourth aspect of the present invention lies in a hardening composition comprising a water soluble high-molecular compound (P1) having a cationic group in the principal molecular chain thereof and a polyfunctional hydrophilic monomer or oligomer (P3) having two or more (meth) acryloyl groups in a molecule.

A fifth aspect of the present invention lies in a printing medium comprising a substrate and an ink-receiving layer disposed on said substrate, said ink-receiving layer comprising a solid layer containing a water soluble high-molecular compound (P1) having a cationic group in the principal molecular chain thereof and a polyfunctional hydrophilic monomer or oligomer (P3) having two or more (meth)acryloyl groups in a molecule.

A sixth aspect of the present invention lies in a process for producing a print product, said process comprising the steps of: providing a printing medium comprising a substrate and an ink-receiving layer disposed on said substrate, said ink-receiving layer comprising a solid layer containing a water soluble high-molecular compound (P1) having a cationic group in the principal molecular chain thereof and a polyfunctional hydrophilic monomer or oligomer (P3) having two or more (meth)acryloyl groups in a molecule; and performing printing with the use of said printing medium and ink, to thereby obtain a print product.

In the following, description will be made of the water soluble high-molecular compound (P1) having a cationic group in the principal molecular chain thereof (hereinafter referred to as "compound P1" for simplification purpose) which is used in the present invention.

The compound P1 contained in the curing composition according to the present invention exhibits a function of fixing coloring materials such as dyes, pigments, dispersants and the like while exhibiting a function of allowing an ink solvent to readily expand and penetrate chiefly because of the cationic group possessed by the compound P1.

The compound P1 may be produced by adding a cationic group to a given water soluble high-molecular compound.

Particularly, the compound P1 may be produced, for example, by a manner (1) of providing a water soluble high-molecular compound and introducing a cationic ammonium group into the principal chain of the high-molecular compound or a manner (2) of providing a water soluble high-molecular compound having a side chain with a terminal hydroxyl group and cationizing the hydroxyl group of the high-molecular compound by means of a cationizing agent such as an amino group-bearing compound or the like.

In the following, each of the manners (1) and (2) will be detailed.

The manner (1) can include (A) alternative addition polymerization between epichlorohydrin and dialkylamine or dialkanolamine to obtain water soluble high-molecular compounds having a number average molecular weight of 2000 to 50000, and (B) alternative addition polymerization between hydrophilic oligomer having opposite molecular chain terminals each having a glycidyl group and asymmetric diamine, dialkylamine or dialkanolamine to obtain water soluble high-molecular compounds having a number average molecular weight of 2000 to 50000.

As a typical example of the alternative addition polymerization (A), there can be mentioned the following alternative addition polymerization reaction between epichlorohydrin and dimethylamine.

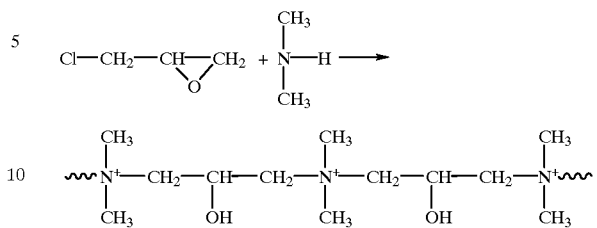

As a specific example of a water soluble high-molecular compound obtained in this case, there can be mentioned a commercially available WISTEX T101 (trademark name, produced by Nagasekasei Kogyo Kabushiki Kaisha; number average molecular weight: about 6000) which has the above described chemical structure. This water soluble high-molecular compound WISEX T101 will be hereinafter referred to as compound P1 (a).

As another typical example of the alternative addition polymerization (A), there can be mentioned the following alternative addition polymerization reaction between epichlorohydrin and diethylamine.

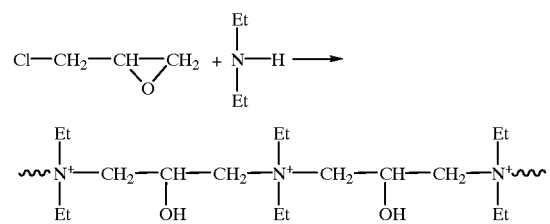

(wherein, Et indicates $CH_2CH_3$.)

As a further typical example of the cross addition polymerization (A), there can be mentioned the following alternative addition polymerization reaction between epichlorohydrin and diethanolamine.

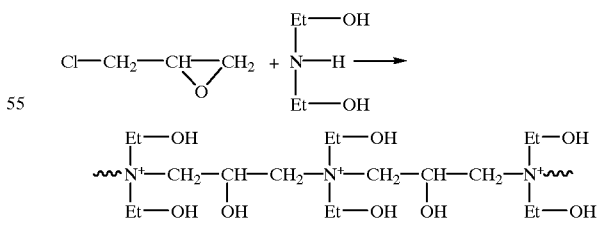

(wherein, Et-OH indicates $CH_2CH_2OH$)

As a typical example of the cross addition polymerization (B), there can be mentioned the following alternative addition polymerization reaction.

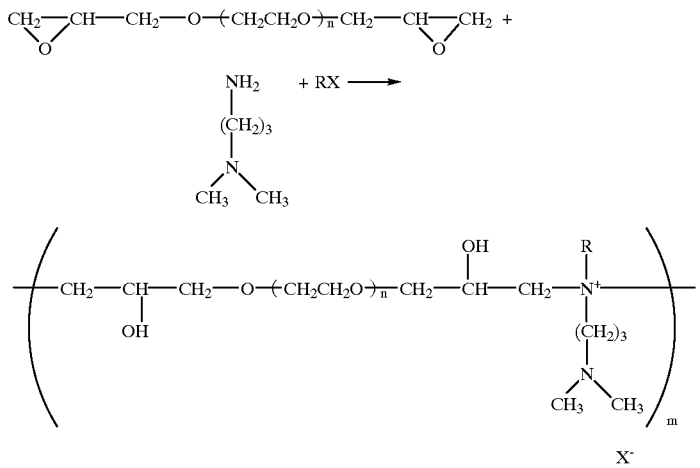

(wherein RX indicates a compound such as HCl or lactic acid.)

Specific examples of a water soluble high-molecular compound by way of the alternative addition polymerization (B) are lactates of high-molecular compounds (hereinafter referred to as compound P1 (b)) obtained by way of the following alternative addition polymerization reaction between polyethylene glycol diglycidyl ether which is obtained by reacting polyethylene glycol of 1000 in number average molecular weight with epichlorohydrin, and dimethylamine.

Further specific examples of a water soluble high-molecular compound by way of the alternative addition polymerization (B) are high-molecular compounds having a principal chain provided with an ammonium group (hereinafter referred to as compound P1 (c)) obtained by way of the following alternative addition polymerization reaction between polyoxyethylene polyoxypropylene diglycidyl ether which is obtained from a block copolymer of 2000 in number average molecular weight comprising polyethylene oxide and polypropylene oxide by way of glycidylation of the terminal hydroxyl group of said block copolymer, and diethanolamine.

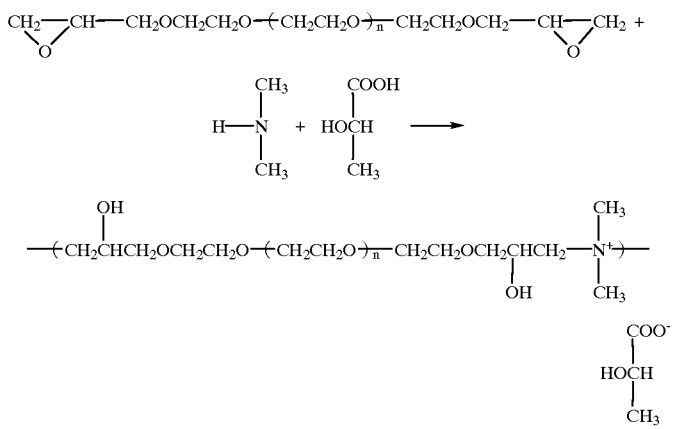

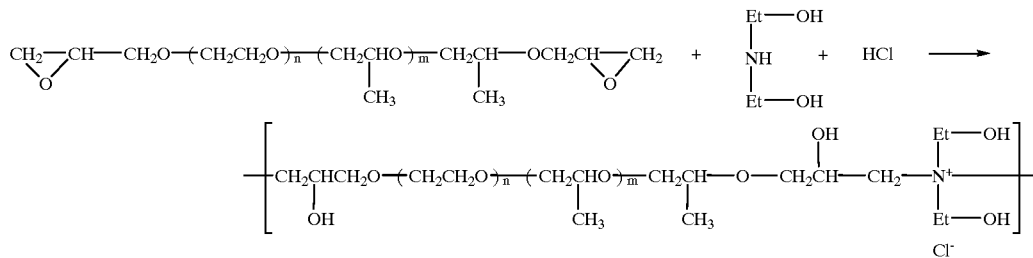

Description will be made of the manner (2). As above described, the manner (2) comprises providing a water soluble high-molecular compound having a side chain with a terminal hydroxyl group and cationizing the hydroxyl group of the high-molecular compound by means of a cationizing agent such as an amino group-bearing compound or the like.

The cationizing agent used in the manner (2) can include, for example, those compounds which will be mentioned below.

2,3-epoxypropyltrimethylammonium chloride (trademark name: WISTEX E-100, produced by Nagasekasei Kogyo Kabushiki Kaisha) which has the following chemical structure.

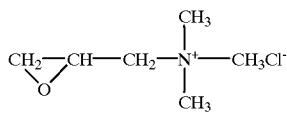

3-chloro-2-hydroxypropyltrimethylammonium chloride (trademark name: WISTEX N-50, produced by Nagasekasei Kogyo Kabushiki Kaisha) which has the following chemical structure.

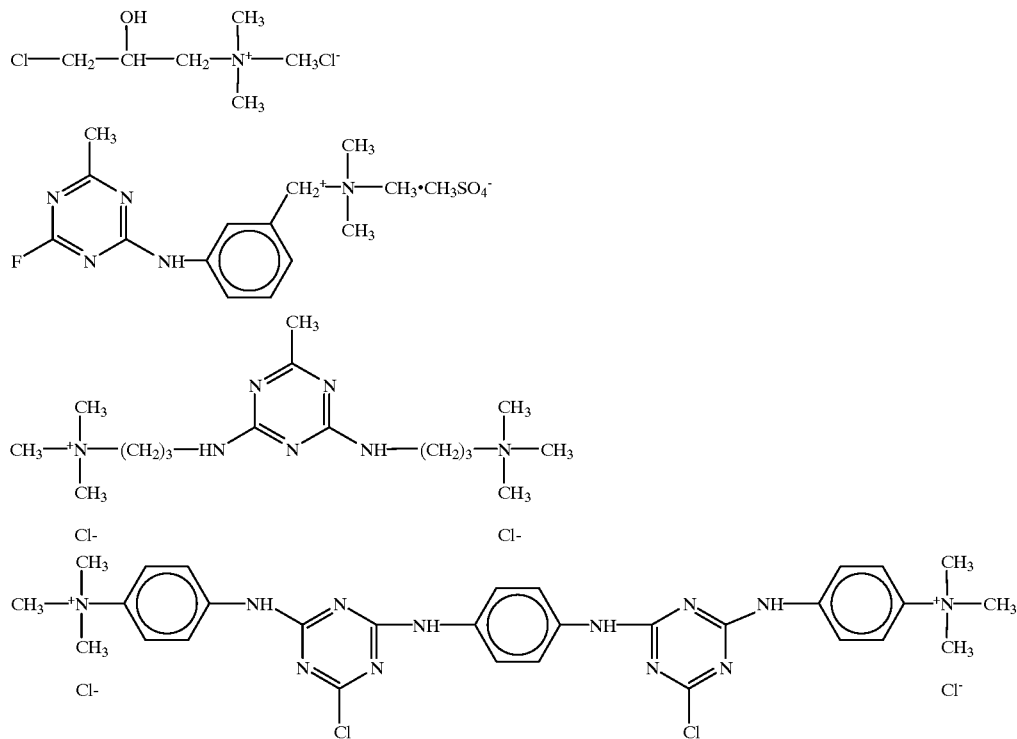

The compound P1 may be produced in accordance with the manner (2) while using any of the above compounds as the cationizing agent.

The compound P1 obtained in accordance with the manner (2) includes:

(C) water soluble acrylic polymers obtained by cationizing an acrylic ester series copolymer having a side chain with a terminal hydroxyl group, and (D) water soluble cationized polyvinyl alcohols having a molecular chain containing 2 to 15 mole % of cationic group which are obtained from a polyvinyl alcohol of 80 mole % or more in saponification value by cationizing the hydroxyl group of the polyvinyl alcohol.

Specific examples of the water soluble acrylic polymer (C) are water soluble high-molecular compounds obtained from acrylic resin of 150000 in weight average molecular weight comprising a copolymer of 2-hydroxyethylmethacrylate, methylmethacrylate, acrylamide and n-butylacrylate being copolymerized at a monomer weight ratio of 20:30:35:15, by cationizing 50% of the hydroxyl groups of the acrylic resin with the use of a cationizing agent comprising 3-chloro-2-hydroxypropyltrimethylammonium chloride (trademark name: WISTEX N-50).

These water soluble high-molecular compounds will be hereinafter referred to as compound P1 (d).

Other specific examples of the water soluble acrylic polymer (C) are water soluble high-molecular compounds obtained from acrylic resin of 130000 in weight average molecular weight comprising a copolymer of 2-hydroxyethylmethacrylate, methylmethacrylate, acrylamide and acrylonitrile being copolymerized at a monomer weight ratio of 20:30:35:10, by cationizing 60% of the hydroxyl groups of the acrylic resin with the use of a cationizing agent comprising 2,3-epoxypropyltrimethylammonium chloride (trademark name: WISTEX E100).

These water soluble high-molecular compounds will be hereinafter referred to as compound P1 (e).

In any case, when a monomer capable of providing a high-molecular compound having a side chain provided with a hydroxyl group such as 2-hydroxyethylmethacrylate is used, it is desired to be used in an amount of 5 to 50 wt. %. As for the quantity of the cationic groups provided, it is desired to be less than 15% based on the repeating units as for the entire molecular chains.

Specific examples of the water soluble cationized polyvinyl alcohol (D) are water soluble high-molecular compounds obtained from polyvinyl alcohol of 60000 in average molecular weight and 85 mole % in saponification value by cationizing about 15% of its hydroxyl groups with the use of a cationizing agent comprising 2,3-epoxypropyltrimethylammonium chloride (trademark name: WISTEX E100).

These water soluble high-molecular compounds will be hereinafter referred to as compound P1 (f).

Other specific examples of the water soluble cationized polyvinyl alcohol (D) are water soluble high-molecular compounds obtained from polyvinyl alcohol of 30000 in average molecular weight and 83 mole % in saponification value by cationizing about 10% of its hydroxyl groups with the use of a cationizing agent comprising 2,3-epoxypropyltrimethylammolium chloride (trademark name: WISTEX E100).

These water soluble high-molecular compounds will be hereinafter referred to as compound P1 (g).

In any case, the cationization rate is desired to be in the range of 2 to 15%. In the case where the cationization rate is made to be less than 2%, there is a tendency that the ink-receiving layer containing such water soluble high-molecular compound is inferior in terms of dye-fixing property and waterfastness. In the case where the cationization rate is made to be exceeding 15%, there is a tendency of entailing problems such that the ink-receiving layer containing such water soluble high-molecular compound is insufficient in adhesion to the substrate and in addition, the dye-fixing is liable to occur at the surface of the ink-receiving layer, resulting in preventing ink from being effectively penetrated. In view of this, as for the quantity of the cationic groups provided, it is desired to be preferably in the range of 5 to 15% or more preferably, in the range of 7 to 12%, based on the repeating units as for the entire molecular chains.

In the following, description will be made of the water soluble high-molecular compound (P2) having a side chain provided with a condensable functional group (hereinafter referred to as "compound P2" for simplification purpose) which is used in the present invention.

The compound P2 contained in the curing composition according to the present invention functions to establish a crosslinking structure whereby curing the curing composition to provide a solid layer as an ink-receiving layer without deteriorating its hydrophilic property even when the condensable functional group is condensed.

The compound P2 includes:
(E) acrylamide series high-molecular compounds having an acrylamide-bearing alkylol group as a side chain, and
(F) acrylic ester series high-molecular compounds having a hydrolyzable trialkylsilyl group.

The high-molecular compounds (E) and (F) are desired to be of a number average molecular weight preferably in the range of 30000 to 300000 or more preferably, in the range of 50000 to 200000.

The high-molecular compounds (E) and (F) can include hydrophilic acrylic polymers obtained by way of copolymerization of copolymerizable components including a monomer having a condensing and crosslinking property (hereinafter referred to as condensable and crosslinkable monomer) preferably at about 0.1 to 20% in terms of weight basis.

As the condensable and crosslinkable monomer, there can be mentioned N-alkylolacrylamides and condensable vinylalkoxysilanes. Specific examples of the N-alkylolacrylamide are N-methylolacrylamide, N-methylolmethacrylamide, N-butoxymethylacrylamide, and N-butoxymethylmethacrylamide. Specific examples of the condensable vinylalkoxysilane are vinyltrimethoxy silane, vinyltriethoxy silane, vinyltris(β-methoxyethoxy) silane, vinylmethyldiethoxy silane, and γ-methacryloyloxypropyltrimethoxy silane.

Any of these condensable and crosslinkable monomers is capable of readily providing a crosslinking structure either by way of self-crosslinking or with the addition of a condensation and crosslinking accelerator. The condensation and crosslinking accelerator usable in this case can include p-toluenesulfonic acid, phosphoric acid, hydrochloric acid, and amine salts of these acids; ammonium salt, sodium salt; carboxylic acids such as acetic acid, lactic acid, lauric acid, crotonic acid, succinic acid, glutaric acid, adipic acid, azelaic acid, pimeic acid, and sebacic acid; and salts of these carboxylic acids.

As above described, as for the amount of any of these condensable and crosslinkable monomers used, it is desired to be about 0.1 to 20% in terms of weight basis. In a more preferred embodiment, it is in the range of 1 to 10% in terms of weight basis. Further, in the most preferred embodiment, being somewhat different depending upon the kind of the condensable and crosslinkable monomer to be used, it is, in general, in the range of 1 to 5% in terms of weight basis.

As another monomer capable of being copolymerized together with the foregoing condensable and crosslinkable monomer, it is desired to use any of the following monomers (1) to (4) because any of them is capable of imparting a hydrophilic property to the acrylic polymer.

(1) Acrylic Esters having an Ethylene Glycol Chain:
monomers represented by the following general formula.
$CH_2=C(R)-COO-(CH_2CH_2O)_n-H$, with n being in the range of 2 to 24 and R being an alkyl group or H.

As specific examples of such monomer, there can be illustrated such commercially available acrylic esters as will be described below.

BLENMER PE-90 (trademark name, produced by Nippon Oil & Fats Co., Ltd.) having the following chemical structure: $CH_2=C(CH_3)—COO—(CH_2CH_2O)_n—H$, with n being 1.9;

BLENMER PE-200 (trademark name, produced by Nippon Oil & Fats Co., Ltd.) having the following chemical structure:

$CH_2=C(CH_3)—COO—(CH_2CH_2O)_n—H$, with n being 4.4; and

BLENMER PE-350 (trademark name, produced by Nippon Oil & Fats Co., Ltd.) having the following chemical structure:

$CH_2=C(CH_3)—COO—(CH_2CH_2O)_n—H$, with n being 7.7.

(2) Acrylic Esters having an Ethylene Glycol Chain with an Alkyl Ether Terminal:

monomers represented by the following general formula.
$CH_2=C(R)—COO—(CH_2CH_2O)_m—(CH_2)_pH$, with m being in the range of 2 to 24, p being in the range of 1 to 16, and R being hydrogen atom or an alkyl As specific examples of such monomer, there can be illustrated such commercially available acrylic esters as will be described below. methoxytriethylene glycol acrylate NK ESTER AM-30G (trademark name, R=H, m=3, p=1);

methoxypolyethylene glycol #400 acrylate NK ESTER AM-90G (trademark name, R=H, m=about 10, p=1);

methoxydiethylene glycol methacrylate NK ESTER M-20G (trademark name, R=$CH_3$, m=2, p=1);

methoxytetraethylene glycol methacrylate NK ESTER M-40G (trademark name, R=$CH_3$, m=4, p=1);

methoxypolyethylene glycol #400 methacrylate NK ESTER M-90G (trademark name, R=$CH_3$, m=about 10, p=1);

methoxypolythylene glycol #100 methacrylate NK ESTER M-230G (trademark name, R=$CH_3$, m=about 24, p=1); and methoxydiethylene glycol acrylate NK ESTER AB-20G (trademark name, R=H, m=2, p=4).

(3) Acrylic Esters having a Tertiary Amino Group:

Specific examples are N,N-dimethylaminoethylmethacrylate, N,N-dimethylaminoethyl acrylate, N,N-dimethylaminopropylmethacrylate, and N,N-dimethylaminopropylacrylate.

(4) Acrylamides:

Specific examples are N,N-dimethylaminoacrylamide, N,N-dimethylaminomethacrylamide, N,N-dimethylaminoethylmethacrylamide, N,N-dimethylaminopropylacrylamide, N,N-dimethylaminopropylmethacrylamide, N,N-dimethylamino-2-hydroxypropylacrylamide, and N,N-dimethylamino-2-hydroxypropylmethacrylamide.

Other than the foregoing monomers, other copolymerizable monomers such as methyl(meth)acrylate, ethyl(meth)acrylate, and 2-hydroxyethyl(meth)acrylate are also usable.

In the following, there will be illustrated specific examples of copolymers which are desirably usable as the compound P2.

Compound P2 (a): copolymer comprising N-methylolacrylamide, 2-hydroxyethylmethacrylate, and methylmethacrylate being copolymerized at a monomer weight ratio of 10:30:60.

Compound P2 (b): copolymer comprising N-butoxymethylacrylamide, 3-chloro-2-hydroxypropylmethacrylate, and methoxytriethyleneglycolacrylate being copolymerized at a monomer weight ratio of 5:30:65.

Compound P2 (c): copolymer comprising N-methylolmethacrylamide, N,N-dimethylamino-2-hydroxypropylmethacrylamide, and ethylmethacrylate being copolymerized at a monomer weight ratio of 8:25:67.

Compound P2 (d): copolymer comprising vinyltris(β-methoxyethoxy) silane, BLENMER PE-200, and ethylmethacrylate being copolymerized at a monomer weight ratio of 5:20:75.

Compound P2 (e): copolymer comprising vinyltriethoxy silane, N,N-dimethylaminoethylmethacrylate, 2-hydroxyethylmethacrylate, and ethylmethacrylate being copolymerized at a monomer weight ratio of 5:15:10:70.

These high-molecular compounds are relatively low in solubility to pure water. Therefore, when these high-molecular compounds are polymerized or dissolved, it is desired to use a polar solvent comprising glycol ether, alcohol or the like.

The curing composition according to the present invention is desired to contain any of the foregoing compounds P1 and any of the foregoing compounds P2 at a weight ratio preferably in the range of from 100:10 to 100:50 or more preferably, in the range of from 100:20 to 100:40.

The curing composition according to the present invention may contain an appropriate component if necessary, in addition to the compounds P1 and P2. As such component, there can be mentioned, for example, water soluble high-molecular compounds having no cationic group. Such water soluble high-molecular compound having no cationic group has a tendency of causing a reduction in the waterfastness of a print product but it exhibits a function of adjusting the physical properties of the curing composition promoting so that the ink absorption rate of the ink-receiving layer is promoted. Therefore, the curing composition according to the present invention may additionally contain such water soluble high-molecular compound having no cationic group within a range wherein the compatibility thereof with the compounds P1 and P2 can be allowed.

As such water soluble high-molecular compound having no cationic group usable in the present invention, there can be mentioned polyvinyl alcohol, polyvinyl alcohol-polyvinyl acetate copolymer, polyvinyl formal, polyvinyl butyral, gelatin, carboxymethylcellulose, hydroxyethylcellulose, hydroxypropylcellulose, hydroxyethylstarch, polyethyloxazoline, polyethyleneoxide, polyethylene glycol, polypropyleneoxide, and polyethyleneoxide/propyleneoxide block copolymer. As for the amount of any of these water soluble high-molecular compounds to be contained in the hardening composition according to the present invention, it is desired to be in the range of 10 to 50 parts by weight versus 100 parts by weight of the sum of the compounds P1 and P2.

The formation of a solid layer as the ink-receiving layer using the curing composition according to the present invention is conducted in a manner of providing a coating composition comprising the curing composition dispersed in a solvent, applying the coating composition onto a substrate (or an object), which is to be dedicated for printing by means of an ink jet printing apparatus, such as a film (for example, a film made of polyethylene tetrephthalate) in an amount to provide a thickness of 5 to 50 um when dried to form a coat composed of the curing composition on the substrate, and subjecting the coat to heat treatment to dry the coat while vaporizing the solvent contained therein to remove and while crosslinking the coat, whereby a solid layer as the ink-receiving layer is formed on the substrate.

The application of the coating composition onto the substrate may be conducted by means of a spinner, roll coater, or spray coater, or by way of screen printing.

The heat treatment of the coat formed on the substrate is desired to be conducted at a temperature of 75° C. to 150° C. Particularly, under condition of using no catalyst, the heat treatment is desired to be conducted at a temperature of about 150° C. for 3 minutes or more. Under condition of using a catalyst, the heat treatment is desired to be conducted at a temperature of about 70° C. for 5 minutes or more. It is possible to conduct aging treatment after the heat treatment, wherein the crosslinking of the coat (the solid layer) is more effectively completed.

As previously described, the present invention provides a further curing composition comprising a water soluble high-molecular compound (P1) having a cationic group in the principal molecular chain thereof (that is, the foregoing compound P1) and a polyfunctional hydrophilic monomer or oligomer (P3) having two or more (meth)acryloyl groups in a molecule (hereinafter referred to as compound P3).

As apparent from the above description, the curing composition comprising the foregoing compound P1 and the foregoing compound P2 is of the type that is cured (crosslinked) with the application of thermal energy.

On the other hand, this curing composition comprising the water soluble high-molecular compound (P1) and the polyfunctional hydrophilic monomer or oligomer (P3) having two or more (meth)acryloyl groups in a molecule (the compound P3) is of the type that is cured with the irradiation of ultraviolet rays.

These two curing compositions are distinguishably used depending upon the kind of a material to be dedicated for printing or the kind of a printing system employed.

Now, as the water soluble high-molecular compound (P1) contained in this curing composition, any of those high-molecular compounds which have been previously illustrated as being usable as the compound P1 may be used.

In the following, description will be made of the compound P3.

As well as in the case of the foregoing compound P2, the compound P3 (the polyfunctional hydrophilic monomer or oligomer having two or more (meth)acryloyl groups in a molecule) functions to establish a crosslinking structure whereby curing the curing composition to provide a solid layer as an ink-receiving layer without deteriorating its hydrophilic property.

The polyfunctional hydrophilic monomer or oligomer as the compound P3 is ultraviolet ray-curable. The compound P3 contained together with the compound P1 in the curing composition makes the curing composition possible to form a film as the ink-receiving layer by way of irradiation of ultraviolet rays.

In this curing composition, as the high-molecular component, the compound P1 is essential. This curing composition may contain other high-molecular component comprising the foregoing compound P2 or other proper water soluble high-molecular compounds.

Further, in any case, if necessary, this curing composition may contain an ultraviolet-curing catalyst.

The compound P3 (that is, the polyfunctional hydrophilic monomer or oligomer having two or more (meth)acryloyl groups in a molecule) can include polyfunctional poly(meth)acryloyl compounds.

Specific examples of such polyfunctional poly(meth)acryloyl compound are ethylene glycol di(meth)acrylate, propanedioldi(meth)acrylate, butanedioldi(meth)acrylate, pentanedioldi(meth)acrylate, hexanedioldi(meth)acrylate, neopentylglycol di(meth)acrylate, hydroxypivalic acid neopentylglycoldi(meth)acrylate, polyethylene glycol di(meth)acrylate, polypropylene glycol di(meth)acrylate, polytetrafuran glycol di(meth)acrylate, trimethylolpropanetri(meth)acrylate, pentaerythritoltri(meth)acrylate, and pentaerythritoltetra(meth)acrylate.

Further, polyester (meth)acrylic esters are also usable as the compound P3. Such polyester (meth)acrylic esters can include oligoester (meth)acrylic esters obtained by reacting aliphatic diol and dicarboxylic acid. The aliphatic diol herein can include ethylene glycol, propanediol, butanediol, pentanediol, hexanediol, neopentyl glycol, polyethylene glycol, polypropylene glycol, tetramethylene glycol, and dipentaerythritol. The dicarboxylic acid herein can include succinic acid, adipic acid, malonic acid, sebacic acid, cyclohexane dicarboxylic acid, phthalic acid, trimellitic acid, endeic acid, tetrahydrophthalic acid, and hexahydrophthalic acid. Other than these, caprolactone oligomers are also usable. As specific examples of these compounds, there can be mentioned the following commercially available products: ARONICS M-6100, ARONICS M-6200, ARONICS M-6250, ARONICS M-6300, ARONICS M-6400, ARONICS M-7100, ARONICS M-8030, and ARONICS M-8100 (produced by Toagosei Chemical Industry Co., Ltd.); KAYARAD DPCA-120, KAYARAD DPCA-20, KAYARAD DPCA-30, and KAYARAD DPCA-60 (produced by Nippon Kayaku Kabushiki Kaisha).

In addition, polyurethane (meth)acrylic esters obtained by reacting oligoester or oligoether having a terminal hydroxyl group, isocyanate-based polyurethane, and hydroxyl group-bearing (meth)acrylic ester are also usable as the compound P3. As specific examples of these polyurethane (meth)acrylic esters, there can be mentioned the following commercially available products: ARONICS M-1100, and ARONICS M-1200 (produced by Toagosei Chemical Industry Co., Ltd.); NK OLIGO U-4HA, NK OLIGO U-6HA, NK OLIGO U-108A, NK OLIGO U-200AX, NK OLIGO U-122A, NK OLIGO U-340A, NK OLIGO U-324A, and NK OLIGO UA-100 (produced by Shinnakamura Kagakukogyo Kabushiki Kaisha).

Further in addition, (meth)acrylic esters of compounds having two or more epoxy groups (which are based on epoxy resin) are also usable as the compound P3. Specific examples of such (meth)acrylic ester are polyethylene glycol diglycidylether di(meth)acrylate, 1,6-hexanedioldiglycidylether di(meth)acrylate, trimethylolpropanetriglycidylether di(meth)acrylate, glycerintriglycidylether tri(meth)acrylate, isocyanuric acid triglycidylether tri(meth)acrylate, (meth)acrylic ester of novolak type epoxy resin, and (meth)acrylic ester of bisphenol type epoxy resin. As specific examples of these compounds, there can be mentioned the following commercially available products: DENACOLACRYLATE DM-201, DENACOLACRYLATE DM-811, DENACOLACRYLATE DM-851, DENACOLACRYLATE DM-832, DENACOLACRYLATE DA-911, DENACOLACRYLATE DM-920, DENACOLACRYLATE DA-931, DENACOLACRYLATE DA-314, DENACOLACRYLATE DA-701, DENACOLACRYLATE DA-721, and DENACOLACRYLATE DA-722 (produced by Nagasekasei Kogyo Kabushiki Kaisha).

Of the above described compounds as the compound P3, some are insufficient in terms of solubility to pure water. In the case where the curing composition contains such compound as the compound P3, the preparation of a coating composition using said curing composition for the formation of the ink-receiving layer is desired to be conducted by using a proper polar solvent. The polar solvent usable in this case can include polar solvents such as N-methyl-2-pyrrolidone, 2-pyrrolidone, and acetonitrile; monovalent alcohols such as isopropyl alcohol; glycol ethers such as ethylene glycol monomethyl ether; and ketones such as methyl ethyl ketone.

In order to make the coating composition to have a low viscosity, it is desired that the curing composition from which the coating composition is prepared contains any of the acrylic monomers having an ethylene glycol chain which have previously illustrated as the compound 2, in view of attaining a desirable compatibility and a desirable polymerization property for the coating composition. Particularly, the use of any of the monofunctional monomers having a tertiary or quaternary group which have been previously illustrated as the acrylamide series monomer makes the resulting ink-receiving layer to have a desirable hydrophilic property and a desirable dye-fixing property. Alternatively, it is possible to use a water soluble monomer or oligomer having a carboxyl group such as esters of phthalic anhydride or succinic anhydride with hydroxyl group-bearing acrylic ester.

The curing composition comprising the compound P1 and the compound P3 according to the present invention is desired to contain the compound P1 and the compound P3 at a weight ratio in the range of from 100:10 to 100:100.

In a preferred embodiment, the curing composition comprising the compound P1 and the compound P3 according to the present invention contains a proper ultraviolet-curing catalyst. As the ultraviolet-curing catalyst, it is desired to use a polymerization initiator capable of being activated upon the application of activation energy radiation. As for the amount of the polymerization initiator contained in the curing composition, it is desired to be made to be in the range of 3 to 10 parts by weight versus 100 parts by weight of the sum of the compounds P1 and P3.

Specific examples of the polymerization initiator are acetophenone series compounds such as 1-hydroxycyclohexylphenylketone, 2-hydroxy-2-methyl-1-phenylpropane-1-one, 1-(4-isopropylphenyl)-2-hydroxy-2-methylpropane-1-one, 2,2-diethoxyacetophenone, 2,2-dimethoxy-2-phenylacetophenone, 2-hydroxy-2-methyl-1-phenylpropane-1-one, 2-methyl-1-[4-(methylthio)phenyl]-2-morpholinopropane-1-one, 4-phenoxydichloroacetophenone, 4-(2-hydroxyethoxy) phenyl(2-hydroxy-2-propyl)ketone, p-t-butyldichloroacetophenone, p-t-butyltrichloroacetophenone, and p-dimethylaminoacetophenone; benzoin ether series compounds such as benzoinmethyl ether, benzoinethyl ether, benzoinisopropyl ether, benzoin-n-butyl ether, benzoinisobutyl ether, and benzylmethyl ketal; benzophenone series compounds such as benzophenone, benzophenonemethyl ether, benzoylbenzoic acid, benzoylbenzoicmethyl, hydroxybenzophenone, 4-phenylbenzophenone, 3,3'-dimethyl-4-methoxybenzophenone, 3,3'-bis(N,N-dimethylamino)benzophenone, 4,4'-bis(N,N-diethylamino) benzophenone, 4',4"-diethylisophthalocyanine, 3,3',4,4'-tetra(t-butyl-oxycarbonyl)benzophenone, 4-benzoyl-4'-methyldiphenylsulfide, and acrylated benzophenone; xanthone series compounds such as thioxanthone, 2-methylthioxanthone, isopropylthioxanthone, 2,4-dimethylthioxanthone, 2,4-diethylthioxanthone, 2,4-diisopropylthioxanthone, 2-chlorothioxanthone, and 2,4-dichlorothioxanthone; diketone series compounds such as diacetyl and benzyl; quinone series compounds such as ethylanthraquinone, 2-t-butylanthraquinone, 2,3-diphenylanthraquinone, 1,2-benzanthraquinone, octamethylanthraquinone, camphorquinone, benzosuberone, and 9,10-phenanthrene. Other than these, CGI 700 and CGI 149 (blend products based on bisacylphosphineoxide) produced by Japan Ciba-Geigy Company are also usable.

The curing composition comprising the compounds P1 and P3 according to the present invention is used in a manner of providing a coating composition comprising the hardening composition dispersed in a solvent, applying the coating composition onto a substrate comprising an object, which is to be dedicated for printing by means of an ink jet printing apparatus, to form a coat on the substrate, drying the coat while vaporizing the solvent contained therein to remove into a dried state, and curing the dry coat to thereby form a solid layer as the ink-receiving layer on the substrate, prior to performing printing for the substrate by means of the ink jet printing apparatus. The application of the curing composition onto the substrate may be conducted by means of a spinner, roll coater, or spray coater, or by way of screen printing. The curing of the dry coat may be conducted by subjecting the dry coat to irradiation of electron beam or ultraviolet rays. In the case of using the irradiation of ultraviolet rays, the curing composition is desired to contain the foregoing ultraviolet-curing agent. However, in the case of using the irradiation of electron beam, it is a matter of course that such ultraviolet-curing agent is not contained in the curing composition.

The curing of the dry coat comprised of the curing composition by the irradiation of ultraviolet rays may be accomplished by passing the substrate having the dry coat thereon under a high pressure mercury lamp of 80 W/cm to 160 W/cm in inputting power at a moving speed of 1 m/min. to 10 m/min. In the case where the curing of the dry coat comprised of the curing composition by the irradiation of ultraviolet rays is conducted by means of a fixed ultraviolet irradiation apparatus, the quantity of ultraviolet rays irradiated is desired to be made in the range of 100 mJ/cm$^2$ to 1000 mJ/cm$^2$ in terms of estimation.

Now, any of the foregoing curing composition comprising the compounds P1 and P2 and the foregoing curing composition comprising the compound P1 and P3 according to the present invention is suitable for the production of a sheet for an overhead projector (OHP). The substrate usable in this case can include, for example, various films used in graphic arts. Specific examples of such film are polyethylene terephthalate films, cellulose acetate films, polycarbonate films, polyvinyl chloride films, polystyrene films, polysulfone films, and aliphatic polyester films.

In the production of the sheet for an OHP using the curing composition according to the present invention, it is possible for the curing composition to contain pore-bearing fine particles of an inorganic or organic material in order to attain a quick absorption capacity (in terms of absorption speed and absorption volume) for the resulting ink-receiving layer. Such inorganic or organic particles can include pigments such as titanium oxide, silica, alumina, talc and clay; inorganic salts; and organic materials.

Further, any of the foregoing curing composition comprising the compounds P1 and P2 and the foregoing curing composition comprising the compound P1 and P3 according to the present invention makes it possible to effectively conduct printing for various objects, even if they are poor in absorption of water-based ink, by means of an ink jet printing apparatus, by forming an ink-receiving layer comprised of the curing composition thereon, wherein print products of the objects can be efficiently produced.

Such object can include, for example, leathers, fabrics, plastic members, metal members, papers, fiberboards, ceramics, and the like. Specific examples are prepaid cards, musical compact discs, CDROMs, digital video discs, ID cards, magnetic cards, lighting acrylic resin plates, polycarbonate plates, signboards, display panels, goods exhibition panels, door plates, name plates, wrapping boxes, envelopes, and the like.

In the following, the present invention will be described in more detail with reference to examples. It should be understood that these examples are only for the illustrative purpose but are not intended to restrict the scope of the present invention to these examples.

EXAMPLE 1

There was provided a 85 μm thick PET (polyethylene terephthalate) film as a substrate.

Separately, there was provided a coating composition composed of: 200 parts by weight of a 50 wt. % aqueous solution of the foregoing compound P1 (a) (that is, the water soluble cationic group-bearing high-molecular compound); 100 parts by weight of a 20 wt. % ethylene glycol monomethyl ether solution of the foregoing compound P2 (a) (that is, the condensable functional group-bearing copolymer); and 1.5 parts by weight of p-toluenesulfonic acid.

The coating composition was applied onto the PET film in an amount to provide a thickness of 20 μm when dried by means of a bar coater, followed by drying at a temperature at 85° C. for 10 minutes, whereby forming a 20 μm thick solid layer as an ink-receiving layer on the PET film.

Thus, there was obtained a printing medium.

EXAMPLE 2

There was provided a 85 μm thick PET (polyethylene terephthalate) film as a substrate.

Separately, there was provided a coating composition composed of: 200 parts by weight of a 50 wt. % aqueous solution of one of the water soluble cationic group-bearing high-molecular compounds previously mentioned as the compound P1 (b); 75 parts by weight of a 20 wt. % ethylene glycol monomethyl ether solution of the foregoing compound P2 (b) (that is, the condensable functional group-bearing copolymer); and 1 part by weight of ammonium chloride.

The coating composition was applied onto the PET film in an amount to provide a thickness of 20 μm when dried by means of the bar coater, followed by drying at a temperature at 85° C. for 10 minutes, whereby forming a 20 μm thick solid layer as an ink-receiving layer on the PET film.

Thus, there was obtained a printing medium.

EXAMPLE 3

There was provided an 85 μm thick PET (polyethylene terephthalate) film as a substrate.

Separately, there was provided a coating composition composed of: 250 parts by weight of an aqueous solution comprised of hydrochloride salt of one of the water soluble cationic group-bearing high-molecular compounds previously mentioned as the compound P1 (d) in an amount of 25 wt. % dissolved in pure water; 50 parts by weight of a solution comprised of the foregoing compound P2 (d) in an amount of 30 wt. % dissolved in a solvent composed of ethylene glycol monomethyl ether and NMP; and 1 part by weight of citric acid.

The coating composition was applied onto the PET film in an amount to provide a thickness of 25 μm when dried by means of the bar coater, followed by drying at a temperature at 120° C. for 10 minutes, whereby forming a 25 μm thick solid layer as an ink-receiving layer on the PET film.

Thus, there was obtained a printing medium.

EXAMPLE 4

There was provided a 85 μm thick PET (polyethylene terephthalate) film as a substrate.

Separately, there was provided a coating composition composed of: 150 parts by weight of an aqueous solution comprised of hydrochloride salt of one of the water soluble cationic group-bearing high-molecular compounds previously mentioned as the compound P1 (e) in an amount of 20 wt. % dissolved in pure water; 50 parts by weight of a solution comprised of the foregoing compound P2 (e) in an amount of 20 wt. % dissolved in ethylene glycol monomethyl ether; and 1 part by weight of citric acid.

The coating composition was applied onto the PET film in an amount to provide a thickness of 25 μm when dried by means of the bar coater, followed by drying at a temperature at 120° C. for 10 minutes, whereby forming a 25 μm thick solid layer as an ink-receiving layer on the PET film.

Thus, there was obtained a printing medium.

EXAMPLE 5

There was provided a 85 μm thick PET (polyethylene terephthalate) film as a substrate.

Separately, there was provided a coating composition composed of: 200 parts by weight of an aqueous solution comprised of sulfate salt of one of the water soluble cationic group-bearing high-molecular compounds previously mentioned as the compound P1 (c) in an amount of 25 wt. % dissolved in pure water; 50 parts by weight of tetraethylene glycol diacrylate as the compound P3; 5.0 parts by weight of 1-(4-isopropylphenyl)-2-hydroxy-2-methylpropane-1-one; and 30 parts by weight of ethylene glycol monomethyl ether.

The coating composition was applied onto the PET film in an amount to provide a thickness of 25 μm when dried by means of the bar coater, followed by drying at a temperature at 85° C. for 10 minutes, to thereby form a 25 μm thick dry coat on the PET film. The dry coat thus formed on the PET film was subjected to curing treatment by irradiating ultraviolet rays thereto at 350 mJ/cm$^2$ in terms of estimation from the high pressure mercury lamp, whereby forming a 25 μm thick solid layer as an ink-receiving layer on the PET film.

Thus, there was obtained a printing medium.

EXAMPLE 6

There was provided a 85 μm thick PET (polyethylene terephthalate) film as a substrate.

Separately, there was provided a coating composition composed of: 200 parts by weight of an aqueous solution comprised of hydrochloride salt of one of the water soluble cationic group-bearing high-molecular compounds previously mentioned as the compound P1 (d) in an amount of 25 wt. % dissolved in pure water; 15 parts by weight of polyethylene glycol #400 digylcidylether diacrylate as the compound P3; 3.0 parts by weight of 1-(4-isopropylphenyl)-2-hydroxy-2-methylpropane-1-one; and 30 parts by weight of isopropyl alcohol.

The coating composition was applied onto the PET film in an amount to provide a thickness of 20 μm when dried by means of the bar coater, followed by drying at a temperature at 85° C. for 10 minutes, to thereby form a 20 μm thick dry coat on the PET film. The dry coat thus formed on the PET film was subjected to curing treatment by irradiating ultraviolet rays thereto at 300 mJ/cm$^2$ in terms of estimation from the high pressure mercury lamp, whereby forming a 20 μm thick solid layer as an ink-receiving layer on the PET film.

Thus, there was obtained a printing medium.

EXAMPLE 7

There was provided a 85 μm thick PET (polyethylene terephthalate) film as a substrate.

Separately, there was provided a coating composition composed of: 200 parts by weight of an aqueous solution comprised of hydrochloride salt of one of the water soluble cationic group-bearing high-molecular compounds previously mentioned as the compound P1 (e) in an amount of 25 wt. % dissolved in pure water; 5 parts by weight of glycerintriglycidylether triacrylate as the compound P3; 3.0 parts by weight of CGI 1700 (produced by Japan Ciba Geigy Company); and 25 parts by weight of isopropyl alcohol.

The coating composition was applied onto the PET film in an amount to provide a thickness of 25 μm when dried by means of the bar coater, followed by drying at a temperature at 85° C. for 10 minutes, to thereby form a 25 μm thick dry coat on the PET film. The dry coat thus formed on the PET film was subjected to curing treatment by irradiating ultraviolet rays thereto at 250 mJ/cm$^2$ in terms of estimation from the high pressure mercury lamp, whereby forming a 25 μm thick solid layer as an ink-receiving layer on the PET film.

Thus, there was obtained a printing medium.

EXAMPLE 8

There was provided a 85 μm thick PET (polyethylene terephthalate) film as a substrate.

Separately, there was provided a coating composition composed of: 100 parts by weight of an aqueous solution comprised of one of the water soluble cationic group-bearing high-molecular compounds previously mentioned as the compound P1 (b) in an amount of 50 wt. % dissolved in pure water; 50 parts by weight of glycerintriglycidylether triacrylate as the compound P3; 5.0 parts by weight of CGI 1700 (produced by Japan Ciba Geigy Company); and 25 parts by weight of N-methyl-2-pyrrolidone.

The coating composition was applied onto the PET film in an amount to provide a thickness of 25 μm when dried by means of the bar coater, followed by drying at a temperature at 125° C. for 10 minutes, to thereby form a 25 μm thick dry coat on the PET film. The dry coat thus formed on the PET film was subjected to curing treatment by irradiating ultraviolet rays thereto at 400 mJ/cm$^2$ in terms of estimation from the high pressure mercury lamp, whereby forming a 25 μm thick solid layer as an ink-receiving layer on the PET film.

Thus, there was obtained a printing medium.

Comparative Example 1

The procedures of Example 3 were repeated, except that the compound P2 contained in the coating composition in Example 3 was replaced by dibutyltin dilaurate, to obtain a printing medium having a 25 μm thick ink-receiving layer (solid layer).

Comparative Example 2

There was provided a 85 μm thick PET (polyethylene terephthalate) film as a substrate.

Separately, there was provided a coating composition composed of: 100 parts by weight of an aqueous solution comprised of polyvinyl alcohol of 85% in saponification value in an amount of 25 wt. % dissolved in pure water; 35 parts by weight of glycerintriglycidylether tri(metha) acrylate; 15 parts by weight of quaternarized hydrochloride salt of N,N-dimethylamino-2-hydroxypropylacrylamide; 5.0 parts by weight of CGI 1700 (produced by Japan Ciba Geigy Company); and 25 parts by weight of isopropyl alcohol.

The coating composition was applied onto the PET film in an amount to provide a thickness of 25 μm when dried by means of the bar coater, followed by drying at, a temperature at 85° C. for 10 minutes, to thereby form a 25 μm thick dry coat on the PET film. The dry coat thus formed on the PET film was subjected to curing treatment by irradiating ultraviolet rays thereto at 400 mJ/cm$^2$ in terms of estimation from the high pressure mercury lamp, whereby forming a 25 μm thick solid layer as an ink-receiving layer on the PET film.

Thus, there was obtained a printing medium.

Evaluation

As for each of the printing mediums obtained in Examples 1 to 8 and Comparative Examples 1 and 2, printing test was conducted in the following manner.

That is, using a commercially available bubble jet color printer BJC-600J (trademark name, produced by Canon Kabushiki Kaisha), on each printing medium, there were spacedly formed test patches each comprising one of seven colors, i.e., yellow, cyan, magenta, black, green, blue and red using four kinds of aqueous inks each comprising a yellow dye, magenta dye, cyan dye, or black dye, to obtain a print sample. Thus, there were obtained ten print samples each having the foregoing test patches spacedly formed thereon.

As for each of the ten print samples thus obtained, evaluation was conducted with respect to transmission density, clearness, and waterfastness & dye-fixing property in the following manner. The evaluated results obtained are collectively shown in Table 1.

Evaluation of Transmission Density:

Using a Macbeth transmission densitometer (produced by Macbeth Company), the density of the solid black area of each print sample was measured.

The measured result is shown in Table 1 based on the following criteria.

AA: the measured density $\geq 1.0$,

A: 1.0>the measured density $\geq 0.7$, and

B: the measured density <0.7.

Evaluation of Clearness:

The clearness of the colored area of each print sample was observed by conducting projection using an overhead projector.

The observed result is shown in Table 1 based on the following criteria.

A: a case wherein the colored area is uniformly colored and transparent,

B: a case wherein the colored area is accompanied by a somewhat unevenly colored portion and also a somewhat turbid portion, and C: a case wherein the colored area is unevenly colored and darkened.

Evaluation of Waterfastness & Dye-fixing Property:

Each print sample was immersed in water contained in a vessel for 1 minute. Thereafter, the print sample was taken out from the vessel, and observation was conducted for the print sample.

The observed result is shown in Table 1 based on the following criteria.

AA: a case wherein any negative influence of water is not observed,

A: a case wherein the occurrence of slight bleeding is observed but this is not problematic in practice, B: a case wherein the occurrence of slight swelling is observed and also the occurrence of a stain due to the dye dissolution is observed at a non-printed area, and C: a case wherein portions where the dyes are bled are observed and the occurrence of peeling at the ink-receiving layer is observed.

It should be understood that the case belonging to the criteria AA is the most desirable and the case belonging to the criteria A is practically acceptable.

As apparent from the results shown in Table 1, it is understood that the ink-receiving layer formed of the curing composition according to the present invention excels particularly in waterfastness & dye-fixing property and satisfactory in transmission density and clearness, and it is apparently surpassing the ink-receiving layer formed using the conventional water soluble resin or ultraviolet ray-curable resin.

TABLE 1

|  | transmission density | clearness | waterfastness & dye-fixing property |
| --- | --- | --- | --- |
| Example 1 | AA | A | A |
| Example 2 | AA | A | A |
| Example 3 | AA | A | AA |
| Example 4 | AA | A | AA |
| Example 5 | A | B | A |
| Example 6 | A | B | A |
| Example 7 | A | B | A |
| Example 8 | A | B | A |
| Comparative Example 1 | AA | A | B |
| Comparative Example 2 | A | B | C |

EXAMPLE 9

There was prepared a full-color display board in the following manner.

That is, the same coating composition as used in Example 5 was applied onto a polypropylene plate incorporated with a white pigment in an amount to provide a thickness of 60 $\mu$m when dried by the roll coater, followed by drying at a temperature at 85° C. for 10 minutes, to thereby form a 60 $\mu$m thick dry coat on the polypropylene plate. Using an ultraviolet irradiation apparatus provided with a high pressure mercury lamp of 80 W/cm in inputting power, the dry coat formed on the polypropylene plate was hardened (cured) by passing the polypropylene plate under the high pressure mercury lamp at a moving speed of 1 m/minute, whereby forming a 60 $\mu$m thick solid layer as an ink-receiving layer on the polypropylene plate. Thus, there was obtained an ink-receiving layer-bearing board.

The resultant board was dedicated for printing by the bubble jet color printer BJC-600J, wherein an image comprising block letters of 24 points and 72 points and a landscape picture. By this, there was obtained a full-color display board. A lighting system was fixed to the rear face of the full-color display board, and the full-color display board was maintained in the outdoors for three weeks while preventing rain from directly contacting with the display board. Thereafter, as for the image formed on the ink-receiving layer of the display board, evaluation was conducted with respect to clearness and waterfastness & dye-fixing property in the same manner as described above. As a result, it was found that the display board still excels in any of the evaluation items even after the endurance for a long period of time.

From the above description, it is understood that in the curing composition according to the present invention, the compound P1 and the compound P2 or P3 in combination provide desirable multiplier effects in a well balanced state, and this enables to form a desirable ink-receiving layer which excels in absorption, absorption rate and dye-fixing property with respect to water-based ink and also in waterfastness. And it is also understood that the ink-receiving layer formed of the curing composition according to the present invention has such excellent properties as above described and therefore, it is very suitable for use in printing particularly by means of a ink jet color printer.

What is claimed is:

1. A process for producing a printing medium, said process comprising the steps of:

(a) providing a curing composition comprising a water soluble high-molecular compound (P1) having a cationic group in a molecule and a polyfunctional hydrophilic monomer or oligomer (P3) having two or more (meth)acryloyl groups in a molecule, wherein said water soluble high-molecular compound (P1) is a water soluble high-molecular compound having a cationic group-bearing principal molecular chain selected from the group consisting of high-molecular compounds (A) obtained by way of alternative addition polymerization between epichlorohydrin and a dialkylamine or dialkanolamine, and high-molecular compounds (B) obtained by way of alternative addition polymerization between a hydrophilic oligomer having opposite molecular chain terminals each having a glycidyl group, and an asymmetric diamine, dialkylamine or dialkanolamine;

(b) applying said curing composition onto a surface of a substrate to form a coating layer on said substrate; and (c) irradiating ultraviolet rays to said coating layer formed on said substrate to cure said coating layer, thereby obtaining a printing medium.

2. A process according to claim 1, wherein the high-molecular compound (B) is a lactate of a high-molecular compound obtained by way of alternative addition polymerization between polyethylene glycol diglycidyl ether which is obtained by reacting polyethylene glycol having a number average molecular weight of 1000 with epichlorohydrin, and dimethylamine.

3. A process according to claim 1, wherein the high-molecular compound (B) is a high-molecular compound obtained by way of alternative addition polymerization between polyoxyethylene polyoxypropylene diglycidyl ether which is obtained from a block copolymer having a number average molecular weight of 2000 comprising polyethylene oxide and polypropylene oxide by way of glycidylation of the terminal hydroxyl groups of said block copolymer, and diethanolamine.

4. A process for producing a print product, said process comprising the steps of:

(a) providing a curing composition comprising a water soluble high-molecular compound (P1) having a cationic group in a molecule and a polyfunctional hydrophilic monomer or oligomer (P3) having two or more (meth)acryloyl groups in a molecule, wherein said water soluble high-molecular compound (P1) is a water soluble high-molecular compound having a cationic group-bearing principal molecular chain selected from the group consisting of high-molecular compounds (A) obtained by way of alternative addition polymerization between epichlorohydrin and a dialkylamine or dialkanolamine, and high-molecular compounds (B) obtained by way of alternative addition polymerization between a hydrophilic oligomer having opposite molecular chain terminals each having a glycidyl group, and an asymmetric diamine, dialkylamine or dialkanolamine;

(b) applying said curing composition onto a surface of a substrate to form a coating layer on said substrate;

(c) irradiating ultraviolet rays to said coating layer formed on said substrate to cure said coating layer into an ink-receiving layer; and (d) performing printing for said ink-receiving layer on the substrate with the use of ink to thereby obtain a print product.

5. A process according to claim 4, wherein the high-molecular compound (B) is a lactate of a high-molecular compound obtained by way of alternative addition polymerization between polyethylene glycol diglycidyl ether which is obtained by reacting polyethylene glycol having a number average molecular weight of 1000 with epichlorohydrin, and dimethylamine.

6. A process according to claim 4, wherein the high-molecular compound (B) is a high-molecular compound obtained by way of alternative addition polymerization between polyoxyethylene polyoxypropylene diglycidyl ether which is obtained from a block copolymer having a number average molecular weight of 2000 comprising polyethylene oxide and polypropylene oxide by way of glycidylation of the terminal hydroxyl groups of said block copolymer, and diethanolamine.

* * * * *

UNITED STATES PATENT AND TRADEMARK OFFICE
CERTIFICATE OF CORRECTION

PATENT NO. : 6,143,363
DATED : November 7, 2000
INVENTOR(S) : Hiromichi Noguchi et al.

It is certified that error appears in the above-identified patent and that said Letters Patent is hereby corrected as shown below:

Title page,
Item [30], Foreign Application Priority Data,
Line 1, "7-095045" should read -- 7-095040 --.

Column 1,
Line 7, "filled" should read -- filed --.
Line 46, "examples," should read -- example, --.

Column 2,
Line 2, "is necessary to" should read -- must --.
Line 18, "and." should read -- and --.

Column 4,
Line 11, "of" should read -- on --.
Line 22, "enable" should read -- enables --.
Line 34, "well" should read -- very --.

Column 6,
Line 23, "WISEX" should read -- WISTEX --.

Column 9,
Lines 32-39,

" 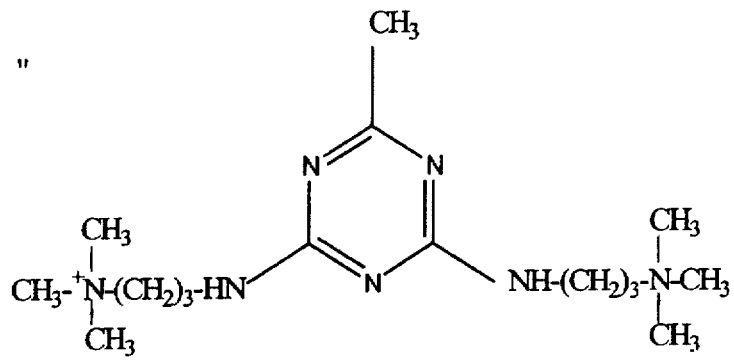 "

UNITED STATES PATENT AND TRADEMARK OFFICE
CERTIFICATE OF CORRECTION

PATENT NO. : 6,143,363
DATED : November 7, 2000
INVENTOR(S) : Hiromichi Noguchi et al.

It is certified that error appears in the above-identified patent and that said Letters Patent is hereby corrected as shown below:

Column 9 cont.
Lines 32-39 should read as follows:

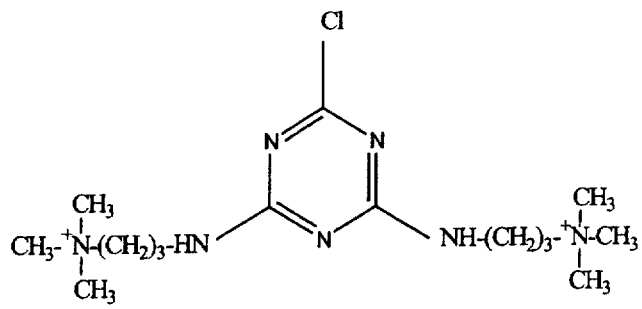

Column 13,
Line 23, "methoxytriethylene" should read -- ¶ methoxytriethylene --.
Line 34, "methoxypolythylene" should read -- methoxypolyethylene --.

Column 14,
Line 59, "um" should read -- $\mu$m --.

Column 15,
Line 29, "a" should be deleted.
Line 62, "compound" should read -- compounds --.

Column 17,
Line 3, "to" (second occurrence) should be deleted.

Column 19,
Lines 13 and 32, "a" should read -- an --.

UNITED STATES PATENT AND TRADEMARK OFFICE
CERTIFICATE OF CORRECTION

PATENT NO. : 6,143,363
DATED : November 7, 2000
INVENTOR(S) : Hiromichi Noguchi et al.

It is certified that error appears in the above-identified patent and that said Letters Patent is hereby corrected as shown below:

Column 20,
Lines 5, 25 and 48, "a" should read -- an --.
Line 57, "digylcidylether" should read -- diglycidylether --.

Column 21,
Lines 7, 31 and 63, "a" should read -- an --.

Column 22,
Line 8, "at, a" should read -- at a --.

Column 24,
Line 16, "a" should read -- an --.

Signed and Sealed this

Thirtieth Day of April, 2002

Attest:

Attesting Officer

JAMES E. ROGAN
Director of the United States Patent and Trademark Office